United States Patent [19]

Hoy et al.

[11] 4,228,219

[45] Oct. 14, 1980

[54] AROMATIC POLYETHER SULFONE USED AS A PRIME COAT FOR A FLUORINATED POLYMER LAYER

[75] Inventors: Leslie R. J. Hoy, St Neots; Malcolm J. Saggers, Cheshunt, both of England

[73] Assignee: Imperial Chemical Industries Limited, London, England

[21] Appl. No.: 33,715

[22] Filed: Apr. 26, 1979

[51] Int. Cl.$^2$ .......................... B05D 1/36; B05D 3/02; B05D 5/08; B32B 27/08

[52] U.S. Cl. .................................... 428/422; 427/195; 427/202; 427/409; 427/374.1

[58] Field of Search ................ 428/422; 427/195, 202, 427/374 R, 409

[56] References Cited

U.S. PATENT DOCUMENTS

| | | | |
|---|---|---|---|
| 3,981,945 | 9/1976 | Altwood et al. | 428/422 |
| 3,993,843 | 11/1976 | Vasta | 428/422 |
| 4,131,711 | 12/1978 | Altwood | 428/422 |
| 4,157,273 | 6/1979 | Brody | 428/422 |

FOREIGN PATENT DOCUMENTS 1253971 11/1971 United Kingdom .

*Primary Examiner*—J. C. Cannon

*Attorney, Agent, or Firm*—Cushman, Darby & Cushman

[57] ABSTRACT

A method of coating a substrate surface, which method comprises: (a) applying a primer composition to the substrate surface which primer composition comprises thermoplastic polymer material dispersed in an inert liquid diluent, at least 50% by weight of said theroplastic polymeric material being constituted by at least one thermoplastic aromatic polyethersulphone; (b) before the applied primer composition has become touch-dry, applying a dispersion of a tetrafluoroethylene polymer top-coat material in an inert liquid diluent over the coated substrate; and (c) removing the inert liquid diluent or diluents and sintering the combined coating of the primer and top-coat layers. The primer compositions do not in the claimed method, need to be dried and baked to exert an effective priming action.

8 Claims, No Drawings

AROMATIC POLYETHER SULFONE USED AS A PRIME COAT FOR A FLUORINATED POLYMER LAYER

The present invention relates to a method of coatng a substrate surface.

It is well known to employ coating compositions based on tetrafluoroethylene polymers, i.e. homopolymers of tetrafluoroethylene and copolymers of tetrafluoroethylene with up to 15% by weight of other monomers such as ethylene, vinyl chloride, vinyl fluoride and hexafluoropropene, on substrates provided by articles such as cookware so as to provide surfaces from which unwanted deposits can be more easily removed by virtue of the non-stick properties of the tetrafluoroethylene polymer. Such a coating should of course be well adhered to the substrate to which it is applied even though it provides a non-stick surface. One method of achieving this objective is to apply a suitable primer layer to the substrate surface before applying a dispersion of the tetrafluoroethylene polymer to form the top-coat; the tetrafluoroethylene polymer top-coat, after drying the dispersion and sintering the polymer, becomes bonded to the substrate surface through the intermediary of the primer layer.

Known primer compositions for the above-described purpose include aqueous dispersions of tetrafluoroethylene polymers which contain an inorganic acid, e.g. chromic acid, phosphoric acid, nitric acid or hydrochloric acid, and an inorganic matrix-forming material such as complexed aluminium phosphate. Examples of such primer compositions are described in our U.K. Pat. No. 1 253 971. In order to exert an effective priming effect, such compositions must be dried and baked in an oven at an elevated temperature (e.g. up to 250° C.) before the top-coat dispersion is applied. While such primer compositions are extremely effective, their use necessitates the employment of an intermediate primer drying/baking step in an oven.

We have now invented a method of coating a substrate surface involving applying a primer composition to the surface and subsequently applying a tetrafluoroethylene polymer top-coat to the surface, in which method it is not required to dry and bake the primer composition at an elevated temperature prior to application of the top-coat in order for the primer layer to exert an effective priming action.

According to the present invention there is provided a method of coating a substrate surface, which method comprises:

(a) applying a primer composition to the substrate surface which primer composition comprises thermoplastic polymeric material dispersed in an inert liquid diluent, at least 50% by weight of said thermoplastic polymeric material being constituted by at least one thermoplastic aromatic polyethersulphone;

(b) before the applied primer composition has become touch-dry, applying a dispersion of a tetrafluoroethylene polymer top-coat material in an inert liquid diluent over the coated substrate; and (c) removing the inert liquid diluent or diluents and sintering the combined coating of the primer and top-coat layers.

There is further provided according to the invention a coated article which comprises at least one substrate surface which has adhering thereto a combined coating of a primer layer derived from a primer composition as defined above and a top-coat layer derived from a tetrafluoroethylene polymer dispersion.

The sintering of the combined coating is usually carried out within the range 327° to 450° C.

In the method of the invention it is essential that the dispersion of the tetrafluoroethylene polymer top-coat is applied over the dispersion of the primer composition while the latter is still wet, i.e. has not yet become touch-dry. If this is not done, and the dispersion of the tetrafluoroethylene polymer top-coat is applied after the primer composition has become touch-dry, then the top-coat layer in the combined coating, after drying and sintering, has poor adhesion to the primer surface. The temperature of the substrate and its applied primer composition before and during application of the top-coat dispersion is conveniently that of the prevailing ambient temperature, as this will invariably allow the primer composition to remain wet sufficiently long for the convenient application of the top-coat dispersion.

The thermoplastic polymer of the primer composition should contain at least 50% by weight of at least one thermoplastic aromatic polysulphone. Preferably the thermoplastic polymer of the primer composition contains substantially 100% by weight of the at least one thermoplastic aromatic polysulphone, although up to 50% by weight of suitable other thermoplastic polymers, e.g. tetrafluoroethylene polymers, may be incorporated if desired.

The primer compositions used in the method of the invention may also contain small quantities of additional constituents, e.g. pigments, fillers, dispersants and viscosity modifiers. A commonly used filler is titanium dioxide, which is usually used in an amount of 1 to 10%, particularly 1 to 5%, of the solids weight in the composition. The use of a pigment, e.g. carbon black, is useful in that it enables primed and unprimed substrate surfaces to be easily distinguished as well as primed and unprimed areas of the same substrate surface. It is, however, advisable not to use too great an amount of carbon black as the adhesion of the top-coat may be deleteriously affected. An amount of up to 10% by weight of the solids weight in the composition is usually satisfactory.

The at least one thermoplastic aromatic polyethersulphone used in the invention comprises repeat units of the general formula $$-Ar-SO_2-$$

in which Ar is a divalent aromatic radical, which may vary from unit to unit in the polymer chain, at least some of the Ar units having the structure

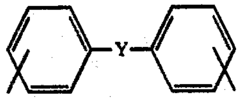

in which Y is oxygen or the divalent radical notionally obtainable by removal of the hydrogen atoms from the OH groups of an aromatic diol such as a 4,4'-bisphenol. Up to 50% of the $-SO_2-$ groups may be replaced by —CO— groups.

Preferred examples of such polyethersulphones have the repeating units

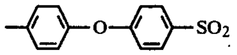

and

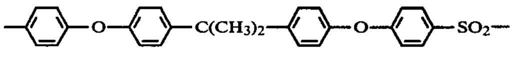

alone or in conjunction with repeating units such as

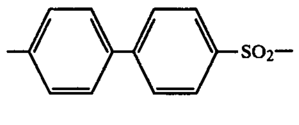

and

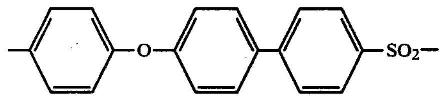

Examples of polyethersulphones and processes for their production are described in British Pat. Nos. 1 016 245, 1 060 546, 1 078 234, 1 109 842, 1 122 192, 1 133 561, 1 153 035, 1 153 528, 1 163 332, 1 177 183, 1 234 301, 1 264 900, 1 265 144, 1 296 383, 1 298 821 and 1 303 252, Canadian Pat. No. 847 963, German OLS Nos. 1 938 806 and 2 433 400 and Swiss Pat. No. 491 981.

The polyethersulphones are preferably made by a nucleophilic condensation process in which an alkali metal halophenate (made by reacting e.g. a dihalobenzenoid compound and an alkali metal hydroxide), or a mixture of substantially equimolar proportions of an alkali metal bisphenate (or bisphenol plus alkali metal carbonate or bicarbonate) and a dihalobenzenoid compound, in which halophenate or dihalobenzenoid compound each halogen atom is activated by an $—SO_2—$ group ortho or para thereto (some, up to 50%, of the $—SO_2—$ groups may be replaced by —CO— groups), is heated to form the polyethersulphone. Examples of such processes are detailed in British Pat. Nos. 1 153 035 and 1 078 234, and Canadian Pat. No. 847 963.

It is desirable, in the interests of primer coating uniformity and dispersion stability, that the polyethersulphone has a particle size of below 25 $\mu$m, as measured by a Micromerograph (Pennwalt Corporation, Pennsylvania, USA), preferably below 20 $\mu$m. The use of low molecular weight polyethersulphones having reduced viscosity (RV) below 0.25 is particularly advantageous in that aqueous dispersions thereof can more easily be made than with high molecular weight polyethersulphones. Thus, while it may take a week or more to obtain such a particle size by ball milling a polyethersulphone of RV 0.42, a polyethersulphone of RV 0.21 can be ball milled, under similar conditions, to below 25 $\mu$m in less than 24 hours. It is preferred to use polyethersulphones of RV 0.03 to 0.2, particularly 0.08 to 0.18. [RV as used herein refers to viscosity measurements made at 25° C. on a solution of the polymer in dimethyl formamide containing 1 g of polymer in 100 $cm^3$ of solution.]

While it is preferred to use a single polyethersulphone in the primer composition two or more polysulphones may be used if desired.

The primer composition preferably has a total solids content (i.e. weight of dispersed polymer plus any pigments, fillers, etc) of 10 to 75%, preferably 20 to 60%, by weight of the dispersion.

The primer composition is preferably an aqueous dispersion as this avoids the presence of organic diluents which may present handling problems. Such an aqueous dispersion may be made by ball milling polyethersulphone powder or granules with water in the presence of an emulsifier, or by precipitation from solution.

An alternative method of making the polyethersulphone dispersion in water is by first making a solution of the polyethersulphone in a solvent such as methylene chloride, then forming an emulsion of that solution in water using a suitable emulsifier, e.g. sodium dioctyl sulphosuccinate, and finally evaporating off the solvent.

The tetrafluoroethylene polymer in the subsequently applied top-coat dispersion is preferably polytetrafluoroethylene or a copolymer of tetrafluoroethylene with up to 5%, especially 0.05 to 2%, by weight of other monomers such as ethylene, vinyl chloride, hexafluoropropene or perfluoropropyl, perfluorovinyl ether.

The tetrafluoroethylene polymer of the top-coat dispersion is preferably made by conventional polymerisation of tetrafluoroethylene in an aqueous or organic liquid medium, normally in the presence of an emulsifying agent. Aqueous dispersions are preferred. Examples of such processes are described in British Pat. Nos. 689 400 and 821 353. The top-coat dispersion normally contains a pigment. While the top-coat composition may contain another dispersed or dissolved plastics material (e.g. an aromatic polyethersulphone), it is preferred that the top-coat composition is substantially a dispersion, preferably aqueous, of a tetrafluoroethylene polymer only as this imparts the best possible non-stick properties.

The method of the invention may be used for the application of coatings to a variety of substrates, e.g. for use in the production of non-stick ovenware and non-stick autoclave linings; ceramics; metals such as ferrous metals, for example cast iron, mild steel, stainless steel, and aluminium and its alloys; and composite surfaces such as metals having a reinforcing coating, such as a flame-sprayed ceramic and/or metal powder coating. The substrate may be in the form of sheet, tube, rod, wire, fibre, or woven fabric.

The substrate surface to which the primer composition is applied should be clean and free from grease and preferably (but not necessarily) roughened (e.g. by grit blasting).

The primer composition and the top-coat dispersion may be applied by any of the conventional techniques, including spraying, dipping and brushing. As mentioned above, the primer composition must not be allowed to become touch-dry before applying the top-coat dispersion which must be applied over the primer composition while the latter is still wet. The combined coating is then dried and sintered, the sintering temperature depending on the nature of the substrate which must of course be capable of withstanding the sintering temperatures. The optimum sintering temperature for a particular substrate may be readily determined by a simple testing. The usual span of sintering temperature is 327° to 450° C. with aluminium e.g. usually being subjected to a temperature within the range 380° to 420° C.

The method of the invention is particularly suited for the coating of cooking utensils for example frying pans, saucepans and bakeware, or for oven linings. In making cooking utensils, a blank may be coated with the combined primer/top-coat coating and then formed; or an already formed utensil may be coated with the combined primer/top-coat coating.

The method of the invention may also be used for the production of non-stick, low friction coatings on many other articles including industrial processing equipment including moulds, rollers, stirrers, mixers, chutes, hoppers and heat sealing jaws, domestic articles such as iron sole plates, food mixers and ice separators and tools such as saw blades, electrical applications such as for example wire insulation.

The invention is now illustrated by the following Examples. All percentages are by weight.

EXAMPLE 1

A primer composition was prepared having the following composition

| | |
|---|---|
| Polyethersulphone dispersion (29% aqueous dispersion) | 103.4 g |
| Titanium dioxide | 10 g |
| Carbon black (25% aqueous dispersion) | 7 g |
| Water | 19.2 g |

The polyethersulphone used was one having a repeat unit of formula

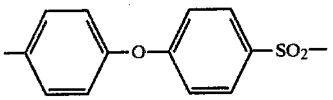

and an RV of 0.11. To prepare the polyethersulphone dispersion, the polymer in the form of a sludge suspension, dispersant and water were charged to a ball mill and ball milled for about 17 hours to reduce the particle size of the polymer particles. The solids content was 29%.

The primer composition was prepared from the denoted constituents by mixing in a 'Silverson' mixer.

The primer composition was sprayed onto a grit blasted aluminium plate (40 to 60 mesh grit) which was immediately over-sprayed (i.e. before the primer composition became touch dry) with a conventional pigmented (biscuit-brown) polytetrafluoroethylene homopolymer top-coat, viz 'Fluon' Supercoat F5202 (an aqueous dispersion containing about 35% polytetrafluoroethylene). The plate with its combined primer/top-coat layer was then dried at 80° C. for 20 minutes followed by sintering at 400° C. for 10 minutes.

The coated plate, after treating for 15 minutes with boiling water, was then rated for adhesion using the following tests:

(i) The thumb nail test (hereinafter denoted as "TN").

A spatula was used to scratch the coating through to the substrate and a thumb nail used to try to peel away as much of the coating as possible at right angles to the scratch. The length of the coating removed was measured and the resistance of the coating graded as follows:

| Grading | Length of coating removed (mm) |
|---|---|
| 5 | 0 |
| 4 | >0<2 |
| 3 | 2-4 |
| 2 | 4-6 |
| 1 | >6 |

A grading of 5 represents a pass; anything else represents a failure.

(ii) Cross hatch test.

The coating was cross-hatched with 2×2 mm squares over a 2 $cm^2$ surface area with a razor-blade so that the blade penetrated the coating to the substrate. Adhesive tape was then applied to the cross-hatched area and pulled off sharply at an angle of 45° to the direction of the application. The tape was applied to the same area 5 time using a new piece of tape each time. The effect of the test was noted in terms of the number of squares removed.

In the TN test, the grading was a pass, while in the cross hatch test, no squares were removed after 5 pulls.

EXAMPLE 2

Three primer compositions were prepared using the same procedure as in Example 1, but having the following compositions.

| | | | |
|---|---|---|---|
| Polyethersulphone dispersion (29% aqueous dispersion) | 103.4 g | 103.4 g | 103.4 g |
| Titanium dioxide | 0 g | 10 g | 20 g |
| Carbon black (25% aqueous dispersion) | 3 g | 3 g | 3 g |
| Water | 0 | 20.6 g | 43.6 g |

The polyethersulphone dispersion used was that used in Example 1.

The primer compositions were each sprayed onto a grit blasted aluminium plate (as in Example 1) and, while still wet, over-sprayed with 'Fluon' Supercoat F5202 as in Example 1. The coated plates were dried and sintered as in Example 1 and after treating for 15 minutes with boiling water, tested for adhesion. In each case, the TN test rated a pass, while in the cross hatch test no squares were removed after 5 pulls.

EXAMPLES 3 TO 6

These Examples concern the use of primer compositions which contain in addition to aromatic polyethersulphone, various amounts of another thermoplastic polymer, viz a tetrafluoroethylene polymer. The constituents are shown in the following Table.

| Constituents of Primer Composition (g) | Used for Example No. 3 | 4 | 5 | 6 |
|---|---|---|---|---|
| Polyethersulphone (29% aqueous dispersion) | 103.4 | 103.4 | 103.4 | 103.4 |
| Carbon black (25% aqueous dispersion) | 5.0 | 5.0 | 5.0 | 5.0 |
| Titanium dioxide | 10.0 | 10.0 | 10.0 | 10.0 |
| Water | 36.7 | 54.2 | 89.2 | 299.2 |
| Tetrafluoroethylene polymer | 7.5 | 15 | 30 | 120 |
| Wt ratio polyethersulphone/tetrafluoroethylene | 4:1 | 2:1 | 1:1 | 1:4 |

The polyethersulphone used was that used in Example 1. The tetrafluoroethylene polymer used was a "lubricant grade" low molecular weight polytetrafluoroethylene powder characterised by a median particle diameter of 3 to 4 μm (as measured optically) and commercially available as 'Fluon' L171.

The primer compositions were each sprayed onto a grit blasted aluminium plate, and while still wet, were over-sprayed with the same top-coat dispersion as used in Example 1. The coated plates were then dried and sintered as in Example 1. After treating for 15 minutes with boiling water, the coatings were tested for adhesion using the tests detailed in Example 1. The results are given in the following Table.

| Example No. | TN | Cross hatch (No. of squares removed after 5 pulls) |
|---|---|---|
| 3 | Pass | 0 |
| 4 | Pass | 0 |
| 5 | Fail | 0 |
| 6 | Fail | 100 |

It can thus be seen that the primer composition containing a 1:1 weight ratio of polyethersulphone/tetrafluoroethylene is just on the borderline of being acceptable with regard to adhesion.

EXAMPLES 7 TO 10

The procedure of Examples 3 to 6 was followed exactly in these Examples except that in each case the applied primer composition was allowed to become touch-dry before the top-coat dispersion was applied (this took about 3 minutes in each case). The results of the adhesion testing are given in the following Table.

| Example No. | TN | Cross hatch (No. of squares removed after 5 pulls) |
|---|---|---|
| 7 | Fail | 99 |
| 8 | Fail | 100 |
| 9 | Fail | 100 |
| 10 | Fail | 100 |

It can be seen that in each case, the adhesion was unsatisfactory.

EXAMPLE 9

A primer composition was prepared having the following composition:

| | |
|---|---|
| Polyethersulphone dispersion (29% aqueous dispersion) | 103.4 g |
| Titanium dioxide | 10 g |
| Carbon black (25% aqueous dispersion) | 3 g |
| Water | 20.6 g |

The polyethersulphone used was one having repeat unit of formula

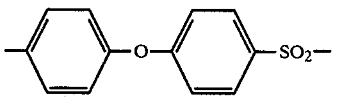

and an RV of 0.13. To prepare the polyethersulphone dispersion, the polymer in the form of damp cake, dispersant and water were charged to a ball mill and ball milled for about 15 hours to reduce the size of the polymer particles. The solids content was 29%.

The primer composition was prepared from the denoted constituents by mixing in a 'Silverson' mixer.

The primer composition was sprayed onto a grit blasted aluminium plate as per Example 1 which was immediately over-sprayed (i.e. before the primer composition had become touch dry) with 'Fluon' Supercoat F5202 top-coat dispersion. The plate with its combined primer/top-coat layer was then dried and sintered as in Example 1, and, after treating for 15 minutes with boiling water, tested for adhesion.

The TN test rated a pass, while in the cross hatch test no squares were removed after 5 pulls.

EXAMPLE 10

The primer composition used for Example 9 was used in this example and exactly the same coating/adhesion-testing procedure adopted with the sole exception that the 'Fluon' F5202 was sprayed onto the aluminium only after the primer composition had become touch-dry (a waiting period of 60 minutes was allowed).

The TN test rated a failure, while in the cross hatch test 100 squares were removed after only 3 pulls.

We claim:

1. A method of coating a substrate surface, which method comprises:

(a) applying a primer composition to the substrate surface which primer composition comprises thermoplastic polymeric material dispersed in an inert liquid diluent, at least 50% by weight of said thermoplastic polymeric material being constituted by at least one thermoplastic aromatic polyethersulphone;

(b) before the applied primer composition has become touch-dry, applying a dispersion of a tetrafluoroethylene polymer top-coat material in an inert liquid diluent over the coated substrate; and (c) removing the inert liquid diluent or diluents and sintering the combined coating of the primer and top-coat layers.

2. A method according to claim 1 wherein said thermoplastic polymeric material of the primer compositions contains substantially 100% by weight of the at least one thermoplastic aromatic polyethersulphone.

3. A method according to claim 1 wherein the at least one thermoplastic aromatic polyethersulphone is selected from the group consisting of polyethersulphones having repeating units of formulae

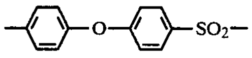

and

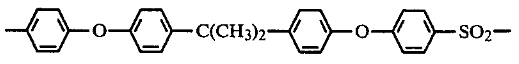

alone or in conjunction with repeating units of formulae

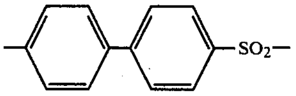

and

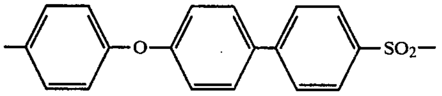

4. A method according to claim 1 wherein the at least one thermoplastic aromatic polyethersulphone has reduced viscosity (RV) below 0.25.

5. A method according to claim 1 wherein the at least one thermoplastic aromatic polyethersulphone has particle size of below 25 μm.

6. A method according to claim 1 wherein the inert diluent of the primer composition is water.

7. A coated article which comprises at least one substrate surface which has adhering thereto a combined coating of a primer layer derived from a primer composition which comprises thermoplastic polymeric material dispersed in an inert liquid diluent, at least 50% by weight of said thermoplastic polymeric material being constituted by at least one thermoplastic aromatic polyethersulphone, and a top-coat layer derived from a tetrafluoroethylene polymer dispersion.

8. A coated article which comprises at least one substrate surface which has been coated by a method according to claim 1.

* * * * *